(12) United States Patent
Kubota et al.

(10) Patent No.: US 8,600,663 B2
(45) Date of Patent: Dec. 3, 2013

(54) SAIL ASSIST DEVICE

(75) Inventors: Yugo Kubota, Nishinomiya (JP);
Hiroshi Yoshii, Nishinomiya (JP); Ikuo Ezaki, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 639 days.

(21) Appl. No.: 12/748,195

(22) Filed: Mar. 26, 2010

(65) Prior Publication Data

US 2010/0250122 A1   Sep. 30, 2010

(30) Foreign Application Priority Data

Mar. 26, 2009   (JP) .................................. 2009-075574

(51) Int. Cl.
*G06F 19/00*   (2011.01)
*B63H 9/00*   (2006.01)

(52) U.S. Cl.
USPC ............. 701/416; 701/418; 701/431; 701/21; 701/26; 702/151; 73/170.03

(58) Field of Classification Search
USPC .......... 114/102.1, 39.11, 102.16; 701/207, 21, 701/25, 26, 400, 410, 411, 416, 418, 431; 702/170.03, 170.05
See application file for complete search history.

(56) References Cited

U.S. PATENT DOCUMENTS

| 6,308,649 B1 * | 10/2001 | Gedeon | 114/39.11 |
| 2006/0243183 A1 * | 11/2006 | Eveleth | 114/102.1 |

FOREIGN PATENT DOCUMENTS

| JP | 3-32995 A | 2/1991 |
| JP | 8-216987 A | 8/1996 |
| JP | 10-109693 A | 4/1998 |
| JP | 10-170643 A | 6/1998 |

OTHER PUBLICATIONS

"KAZI," KAZI Co., Ltd., published Oct. 1, 2008, pp. 110-115, 168-171.

* cited by examiner

*Primary Examiner* — Ronnie Mancho
(74) *Attorney, Agent, or Firm* — Birch, Stewart, Kolasch & Birch, LLP (57) ABSTRACT

This disclosure provides a sail assist device, which includes a wind direction sensor for measuring a wind direction, a ship position acquiring module for acquiring a latitude and a longitude of the ship, and a display module for calculating a layline based on the latitude and longitude of the ship, a latitude and a longitude of a target position of the ship, and the wind direction, with the target position being a reference, and displaying a target mark indicating the target, a ship mark indicating the ship, and the layline.

20 Claims, 9 Drawing Sheets

SAIL ASSIST DEVICE

CROSS-REFERENCE TO RELATED APPLICATION(S)

This application claims priority under 35 U.S.C. §119 to Japanese Patent Application No. 2009-75574, which was filed on Mar. 26, 2009, the entire disclosure of which is hereby incorporated by reference.

TECHNICAL FIELD

The present invention relates to a sail assist device for displaying various information which a crew can use in steering a ship such as a yacht which sails with the wind.

BACKGROUND

If a ship sailing with the wind such as a yacht is sailed, a crew has to steer the yacht with a target position and a wind direction taken into consideration. For example, in an upwind state, that is, where a target position (hereinafter, arbitrarily referred to as a "mark") is on the windward side, the yacht cannot be sailed along the wind axis linearly, and must be sailed at a shallow angle as much as possible to the wind axis as disclosed in Magazine "KAZI," KAZI Co., Ltd., published Oct. 1, 2008, pp. 110-115, 168-171. At this time, an angle at which the yacht can steer most in the direction of the target position is inherent to the respective yachts, and the angle is referred to as a maximum windward angle, which is 45 degrees, for example. Since the course direction is different from the direction of the target position, unless the yacht is sailed with tacking, it cannot arrive at the target position.

Meanwhile, not limited to a race, especially in the case of a race, a ship needs to be sailed with losses kept to a minimum in order to arrive at the target position earlier than other ships. For this purpose, the ship needs to always be sailed at the maximum windward angle described above, and even if the ship is always sailed at the maximum windward angle, it must be sailed in an area with a small sailing loss in order to arrive efficiently at the target position. Thus, the boundary of the area having a small sailing loss is a so called "layline."

Figure 8A:
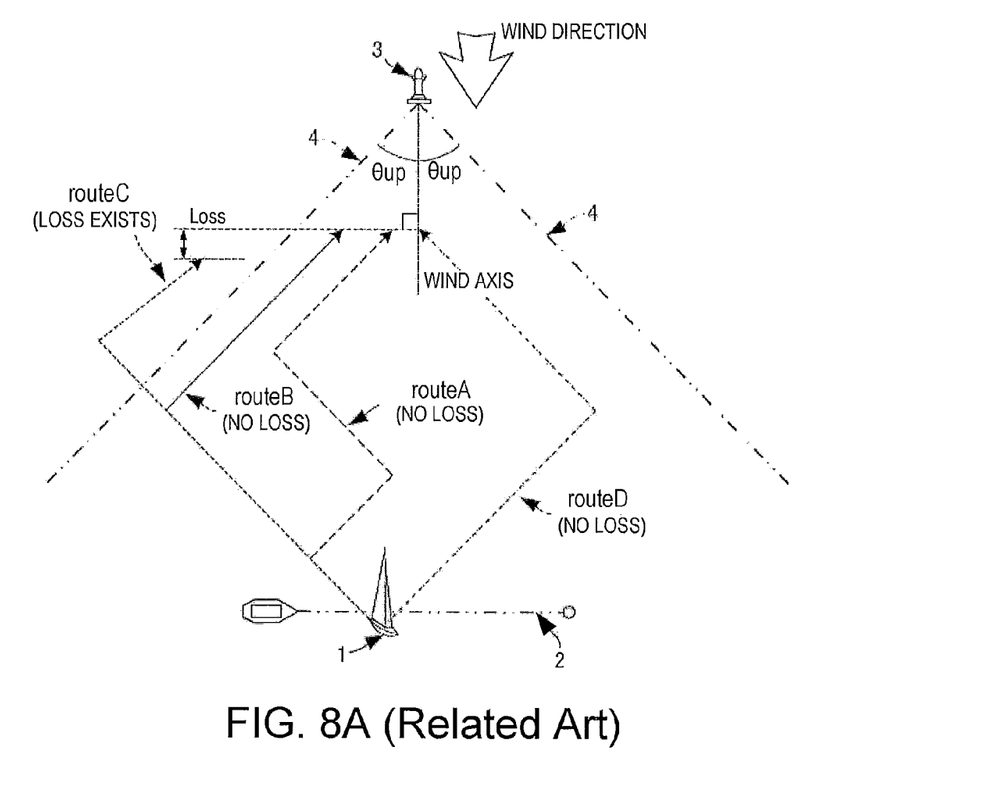
FIGS. 8A to 8C are diagrams for illustrating a layline and a concept of loss during sailing.
Figure 8B:
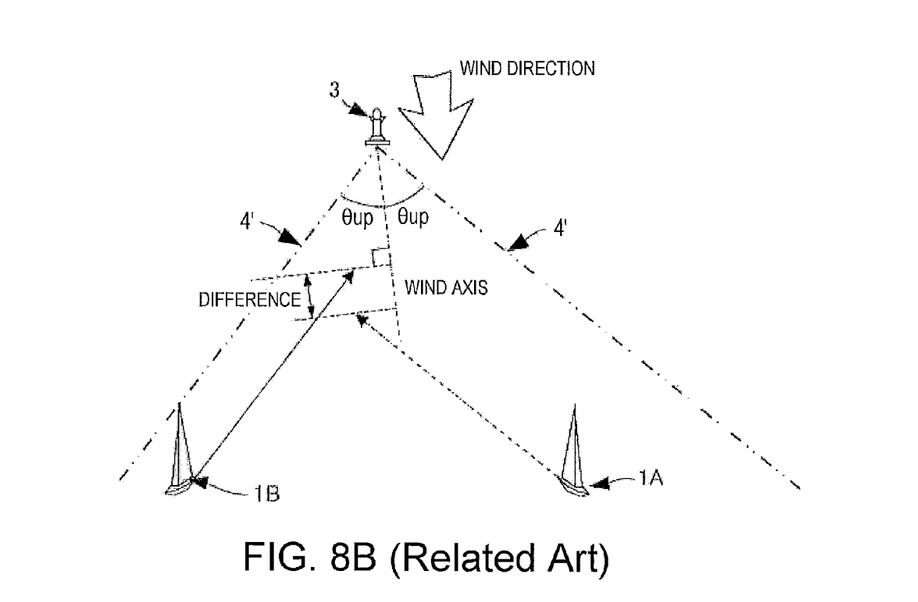
Figure 8C:
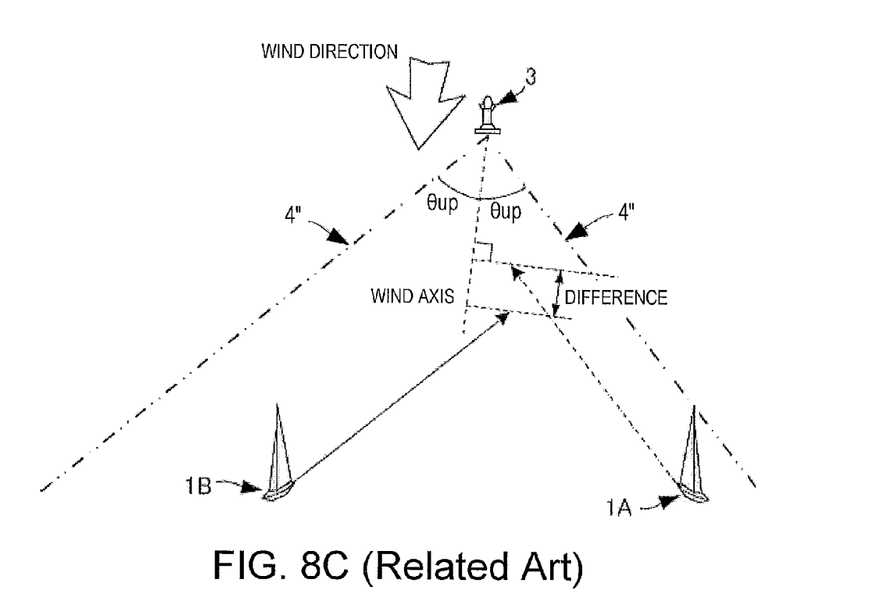

FIGS. 8A to 8C are diagrams for illustrating the layline and a concept of the loss during sailing. FIG. 8A shows a case where a wind blows from a mark 3 as a target point to a start line 2. FIGS. 8B and 8C show cases where the wind direction is changed under the situation of FIG. 8A. As shown in FIGS. 8A to 8C, a layline 4 is a virtual line extending in the direction at a maximum windward angle θup to the wind axis.

In a case in which a yacht 1 starts from the start line 2 to sail toward the mark 3, it can take various courses such as routes A to D shown in FIG. 8A, for example. However, if the course of the route C is taken, the yacht 1 enters an area on the windward side of an area surrounded by the layline 4. In this case, the sailing distance becomes longer compared with other routes (routes A, B and D), and a sailing loss occurs.

Further, as shown in FIGS. 8B and 8C, the wind does not blow constantly from one direction, and the wind direction and the wind speed change constantly. If the wind direction (wind axis) changes, the layline also changes, and as shown in FIGS. 8B and 8C, depending on the direction to which the wind direction (wind axis) changes, sailing until the target position is decided whether or not to be good.

For this reason, the crew must perform steering at each point under a situation momentarily changing while concerning the layline based on a relationship between the mark (target position) and a position of the crew's ship, and the wind direction, and estimating a change in the wind. Various information as a criterion for crew's judgment has been sensed by the crew, and the crew have been allowed to accurately perform sailing by repeating such experiences. That is, accurate sailing has not been able to be performed without knowledge, experience and concentration of the crew.

SUMMARY

The present invention is thus made in view of the situations described above, and provides a sail assist device for displaying assist information for reducing burdens of a crew and performing efficient sailing.

According to an aspect of the present invention, a sail assist device includes a wind direction sensor for measuring a wind direction, a ship position acquiring module for acquiring a latitude and a longitude of the ship, and a display module for calculating a layline based on the latitude and longitude of the ship, a latitude and a longitude of a target position of the ship, and the wind direction, with the target position being a reference, and displaying a target mark indicating the target, a ship mark indicating the ship, and the layline.

The display module may calculate a present layline based on the latitude and the longitude of the target position, and the latitude and the longitude of the ship and the wind direction which are sequentially inputted, and may display the calculated present layline as well as one or more past laylines simultaneously.

The display module performs an averaging process on a plurality of present and/or past wind directions measured and calculates an averaged layline, or directly calculates an averaged layline based on a plurality of present and/or past laylines, and displays the averaged layline.

The sail assist device may further include an operation module for accepting an input of selection of a wind-up mode in which a windward direction is displayed on a display screen near an upper end therein of an indicator of the display module, and outputting mode information to the display module. The display module may display the layline in the wind-up mode.

The sail assist device may further include an azimuth information acquiring module for acquiring a course azimuth of the ship. The display module may calculate a most efficient course azimuth based on the ship position, the target position, the layline and the course azimuth, and may display the most efficient course and the course azimuth.

The sail assist device may further include an azimuth information acquiring module for acquiring a bow azimuth of the ship. The display module may calculate a most efficient bow azimuth based on the ship position, the target position, the layline and the bow azimuth, and may display the most efficient bow azimuth and the bow azimuth.

The sail assist device may further include an other ship position acquiring module for acquiring one or more other ships positions. The display module may displays one or more other ship marks that indicates the one or more other ship positions, and may display a plurality of even lines that are perpendicular to a wind axis based on the wind direction and set at a predetermined interval in a direction of the wind axis.

The display module may further set a numerical information displaying window that displays various numerical information related to sailing of the ship on a display screen of the display module.

BRIEF DESCRIPTION OF THE DRAWINGS

The present disclosure is illustrated by way of example and not by way of limitation in the figures of the accompanying drawings in which the like reference numerals indicate like elements and in which.

DETAILED DESCRIPTION

Hereinafter, description is given of several sail assist devices in the forms of embodiments of the invention with reference to the appended drawings.

(First Embodiment)

Figure 1:
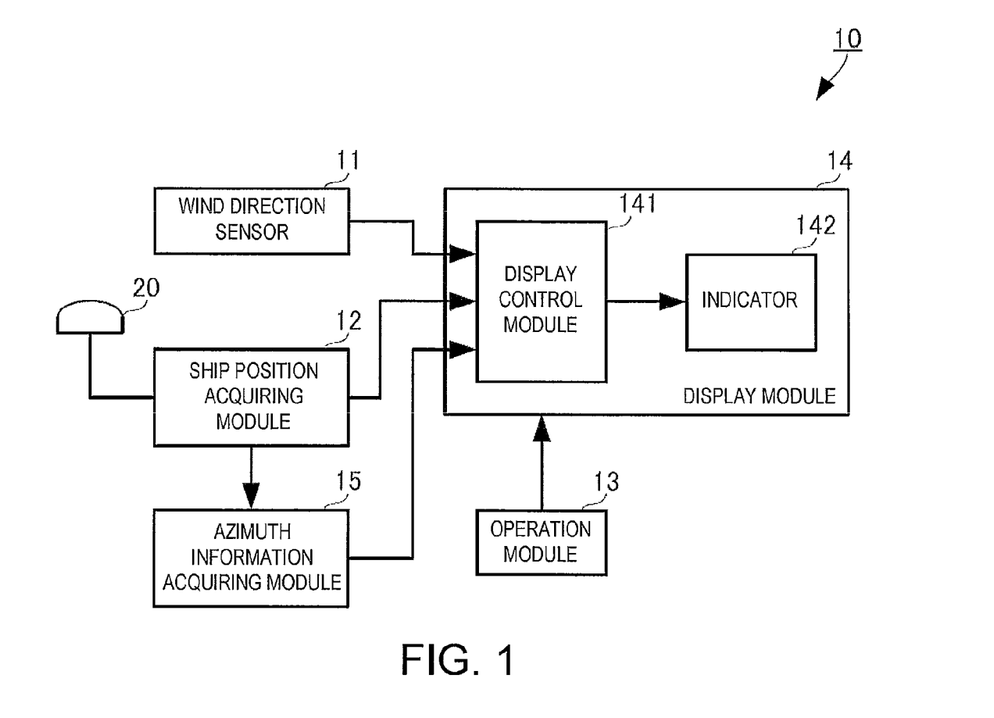
FIG. 1 is a block diagram showing a substantial configuration of a sail assist device according to a first embodiment of the present invention.

FIG. 1 is a block diagram showing a substantial configuration of a sail assist device 10. The sail assist device 10 includes a wind direction sensor 11, a ship position acquiring module 12, an operation module 13, a display module 14, and an azimuth information acquiring module 15. The wind direction sensor 11 sequentially measures a wind direction and a wind speed at a predetermined time interval to output wind direction azimuth data (e.g., 300 degrees) and wind speed data to the display module 14. The ship position acquiring module 12 includes, for example, a position measurement instrument such as a GPS receiver, and measures a position of a ship to be sailed based on a signal for position measurement received by a position measurement signal receiving antenna 20. The ship position acquiring module 12 acquires the ship position data including latitude and longitude information at a predetermined time interval to output to the display module 14 in a similar manner for the wind direction azimuth data and wind speed data described above. Note that the ship position acquiring module 12 is not limited to the position measurement instrument and may be so long as it can functionally acquire the ship position as the latitude and longitude information. The azimuth information acquiring module 15 is a functional module for detecting a course azimuth and a bow azimuth. For example, the azimuth information acquiring module 15 calculates the course azimuth based on a temporal change in a plurality of ship positions time-sequentially obtained from the ship position acquiring module 12. Further, the azimuth information acquiring module 15 is configured to include a direction sensor such as a gyrocompass of which base axis is set along the bow direction and a attitude sensor for detecting a ship attitude (roll, pitch and yaw) using a plurality of antennas whose positional relation is fixed on the ship, and detects the bow azimuth based on the outputs from the sensors. The azimuth information acquiring module 15 outputs the acquired course azimuth and the bow azimuth to the display module 14.

The operation module 13 includes an operator for accepting an input manipulated by a crew, who operates the ship, to accept various input information and a mode selection and outputs them to the display module 14. More specifically, when the operation module is inputted with the latitude and longitude information of the target position, it outputs target position data including latitude and longitude data to the display module 14. Note that the target position can be inputted not only from the operation module 13 but also by selecting with a cursor a displayed position in a chart displayed by the display module 14 or by directly pointing the target position if the display module 14 is configured by a touch panel. Moreover, if a maximum windward angle θup or a maximum leeward angle based on the ship is inputted, the operation module outputs the data to the display module 14. Further, if any one of the display modes set in plural number is selected, the operation module outputs the mode selection data indicating the selected mode to the display module 14. Here, the display mode includes besides "a north-up mode" and "a head-up mode" of related art, "a target mark-up mode," "a wind-up mode" and the like described in this embodiment.

The display module 14 includes a display control module 141 and an indicator 142. The display control module 141 calculated a wind axis based on the wind direction azimuth data and the target position data. Here, the wind axis means an axis extending in a direction parallel to the wind direction passing through the target position. When the wind axis is determined, the display control module 141 calculates a positional relationship between the target position and the ship position based on the target position data and the ship position data. Then, the display control module 141 determines whether the target position is on the windward side or the leeward side with respect to the ship position based on the positional relationship and the wind direction azimuth data. Note that the determination of the windward and leeward may be inputted by crew manipulation.

Then, if the target position is on the windward side of the ship, the display control module 141 sets a layline for windward sailing based on the positional relationship between the target position and the ship position, the wind axis, and the maximum windward angle θup. That is, a straight line extending in the direction at the maximum windward angle θup with respect to the wind axis is set as the layline on the ship side of the target position as a reference. On the other side, if the target position is on the leeward side of the ship, the layline for leeward sailing is set based on the target position, the maximum leeward angle θdown, and the wind axis.

The display control module 141 continuously stores the layline set in the aforementioned manner over a predetermined period of time with time information.

Subsequently, the display control module 141 forms image data based on the mode selection data so as to display an image in the selected display mode on a display screen of the indicator 142. That is, the display control module 141 forms the image data by setting a target mark indicating the latitude and longitude of the target position, a ship mark indicating the latitude and longitude of the ship, line segments forming present laylines and past laylines, and the like in accordance with the display mode to output it to the indicator 142. The indicator 142 includes a so-called liquid crystal display in this embodiment, and displays the image data given from the display control module 141. Then, through such a process, an image as shown in FIG. 2A or 2B is displayed on the display screen of the indicator 142.

Next, a description is specifically given of displayed contents with reference to the drawings. FIGS. 2A and 2B are diagrams showing example displayed images on the indicator 142. FIG. 2A shows a case of the target mark-up mode. FIG. 2B shows a case of the wind-up mode. Note that the displayed images show the cases of a windward condition where the target position is on the windward side of the ship position. However, even in the case of a leeward condition where the target position is on the leeward side of the ship position, similar displayed images can also be formed.

(A) Display in Target Mark-up Mode

Figure 2A:
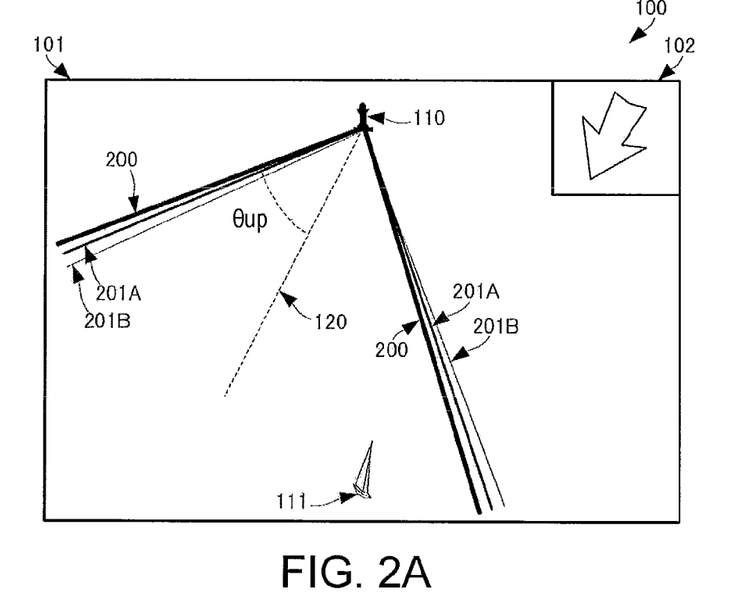
FIGS. 2A and 2B are diagrams showing example displayed images on an indicator shown in FIG. 1.
Figure 2B:
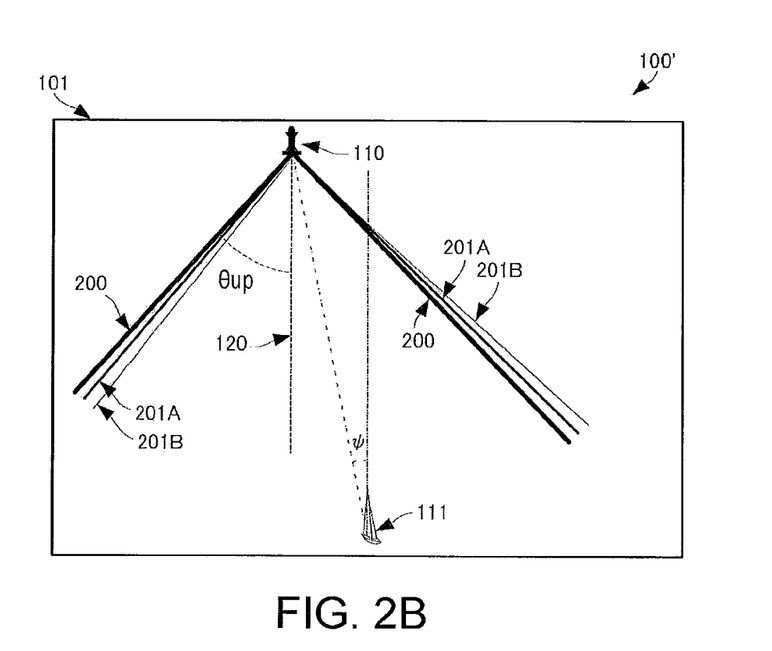

When the target mark-up mode is selected using the operation module 13, the display control module 141 forms image data for a target mark up, as shown in FIG. 2A, to display it on the indicator 142. A displayed image 100 for the target mark up (hereinafter, simply referred to as "displayed image 100") includes a layline displaying window 101 and a wind direction display window 102. In this case, the layline displaying window 101 is the main window and displayed on substantially the whole area of the displayed image 100. On the other hand, the wind direction displaying window 102 is displayed on the displayed image 100 at a corner on the observer's upper right in a predetermined small window. Note that the position where the wind direction displaying window 102 is displayed is not limited to this position, and may be any position so long as the information displayed in the layline displaying window 101 is not hidden. The wind direction displaying window 102 may be selectively displayed or non-displayed.

On the layline displaying window 101, displayed are a target mark 110, a ship mark 111, and a present layline 200 and a plurality of past laylines 201A and 201B. The target mark 110 is displayed at substantially the center in the width direction and near the upper end of the displayed image 100 (layline displaying window 101). The ship mark 111 is displayed at substantially the center in the width direction and near the lower end of the displayed image 100 (layline displaying window 101). That is, the target mark 110 and the ship mark 111 are displayed at positions substantially the center in width direction and at both ends in a vertical direction, respectively, of the layline displaying window 101.

The laylines 200, 201A and 201B are displayed by line segments with the target mark 110 as a starting point. Specifically, the display control module 141 calculates a straight line connecting the ship position with the target position based on the ship position data and the target position data, and then calculates an angle formed by the straight line and the wind axis direction. Then, the display control module 141 sets a wind axis line 120 originating at the target mark 110 and extending to the side of the ship mark 111 so that the wind the wind axis line 120 forms the calculated angle with the vertical direction of the displayed image 100. The wind axis line 120 may be displayed or not depending on the setting. After setting the wind axis line 120, the display control module 141 further sets the present layline 200 extending at the maximum windward angle θup with respect to the wind axis line 120 with the target mark 110 being a reference point, and displays the present layline 200 in the layline displaying window 101.

Furthermore, the display control module 141 also displays the past laylines 201A and 201B in the layline displaying window 101. In this case, the display control module 141 stores azimuths of the past laylines 201A and 201B obtained by the previous processing, and calculates azimuth angle differences between the azimuths of the past laylines and the present layline 200. Then, the past laylines 201A and 201B are displayed in the layline displaying window 101 at positions based on the azimuth angle differences with respect to the present layline 200. At this time, the past laylines 201A and 201B are displayed in such a fashion which based on the time information, the more past the layline is, the narrower in width the line is displayed (for example, the layline 201B is narrower than the layline 201A in FIG. 2A). This allows trails of the layline to be displayed. Note that shown here is an example where the more past the layline is, the narrower the displayed line; however, there may be a case in which the more past the layline is, the lower the display brightness or the display color may be changed.

In the wind direction displaying window 102, a thick arrow is displayed so that the direction of the wind axis 120 from the target mark 110 to the ship mark 111 side matches the direction of the thick arrow head. In this way, the wind direction is displayed graphically, facilitating grasp of the wind direction.

(B) Display in Wind-up Mode

When the wind-up mode is selected using the operation module 13, the display control module 141 forms image data for wind up, as shown in FIG. 2B, to display it on the indicator 142. The displayed image 100' for wind up (hereinafter, simply referred to as "displayed image 100'") includes one window. Here, chart information may be acquired and held in advance to superimpose the layline on the chart.

In the displayed image 100', displayed are the target mark 110, the ship mark 111, and the present layline 200 and the plurality of past laylines 201A and 201B.

The displayed image 100' is displayed so that the windward is always the upper end of the displayed image 100', and the ship mark 111 is at the center or any position of the displayed image 100'. The target mark 110 is displayed so as to be movable in the displayed image 100' according to the wind direction. Specifically, the display control module 141 calculates a direction of a straight line connecting the ship position with the target position based on the own ship position data and the target position data to calculate an angle ψ formed by the straight line and the wind axis. Then, the display control module 141 sets a direction at the angle ψ with respect to a direction from the upper end with the ship mark 111 being a reference, and rotates the chart so that the target mark 110 is displayed in the set direction.

Additionally, in the displayed image 100', the present layline 200 is displayed in such a manner with the target mark 110 as the starting point, the wind axis 120 is set to be parallel to the vertical direction of the screen and a line segment is set to extend in a direction at the maximum windward angle θup with respect to the wind axis 120. Then, the past laylines 201A and 201B are set and displayed based on the azimuth difference from the present layline 200, similarly to the case of the target mark-up mode described above.

With the displays described above, the crew can easily grasp the relationship between the present ship position and the target position as well as between the present ship position and the layline at that time. Further, since the trails of the layline are displayed, the crew can easily grasp the nearest previous trend of the wind. Then, such information easily grasped enables the crew to adequately make a determination leading to suitable sailing to be performed.

In addition, since the plural modes may be selectively used for the display as described above, the crew can obtain various information suitably displayed depending on the situation.

Note that in the above description, the target mark 110, the ship mark 111, the laylines 200, 201A and 201B are displayed by way of example; however, other information may be displayed additionally or alternatively.

Figure 3:
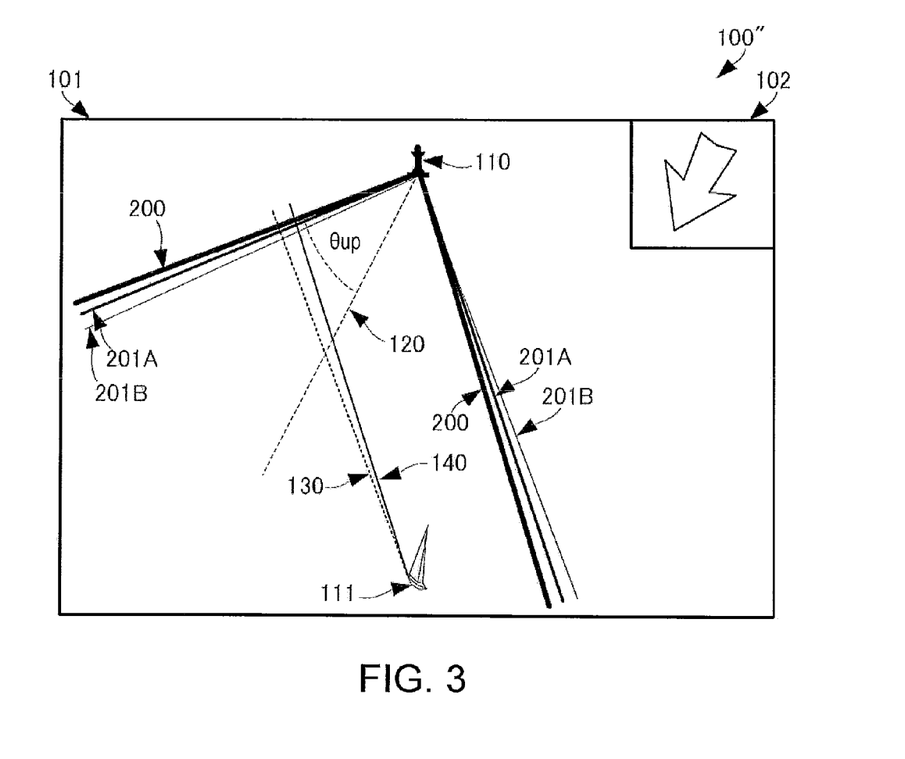
FIG. 3 is a diagram showing an example displayed image in which a present course line and an optimum course line are displayed.

FIG. 3 is a diagram showing an example displayed image in which a present course line and an optimum course line are further displayed, and shows the displayed image of a case where the target mark-up mode is selected. Note that the following description shows an example in which the information of the "course" is displayed; however, an optimum bow azimuth line with respect to a "bow azimuth" may be displayed, and the optimum route line with respect to a "route" may also be displayed similarly to the case of the course described below.

In the displayed image 100" shown in FIG. 3, a present course line 130 and an optimum course line 140 are additionally displayed on the displayed image 100 shown in FIG. 2A. Here, the present course line 130 can be displayed based on the course azimuth acquired by the azimuth information acquiring module 15. Additionally, the optimum course line 140 can be displayed by calculating a most efficient course based on the ship position data, the target position data, the layline and the course azimuth. In this way, displaying of the present course line 130 and the optimum course line 140 enable the available information for sailing to be further provided to the crew.

Second Embodiment

Next, a sail assist device according to a second embodiment of the invention is described with reference the drawings. The sail assist device of this embodiment has substantially the same configuration as the sail assist device of the first embodiment, but is different in the configuration of the displayed image. Specifically, the first embodiment describes the sail assist device in which only the graphical display is performed. However, the sail assist device of this embodiment is provided with a text displaying window displaying various information in a text format.

Figure 4:
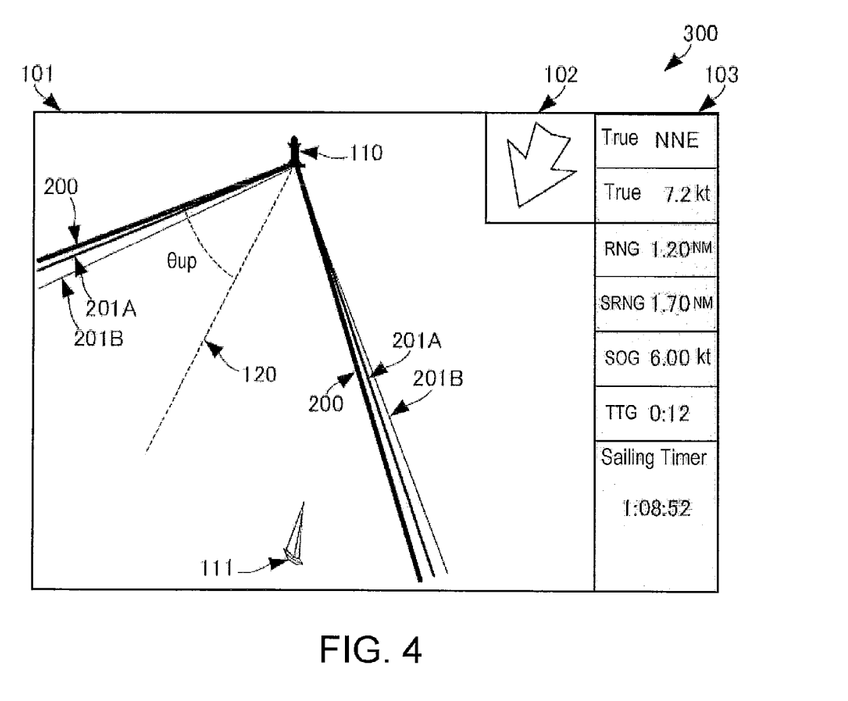
FIG. 4 is a diagram showing an example displayed image including a text displaying window of a sail assist device according to a second embodiment of the invention.

FIG. 4 is a diagram showing an example displayed image 300 including the text displaying window, and shows the case where the target mark-up mode is selected.

As shown in FIG. 4, the displayed image 300 includes a layline displaying window 101, a wind direction displaying window 102, and a text displaying window 103.

The displayed image 300 is made by providing the text displaying window 103 to the displayed image 100 shown in FIG. 2A along one side thereof in a lateral direction. The layline displaying window 101 and the wind direction displaying window 102 have substantially the same configurations as those of FIG. 2A, and are located in areas other than where the text displaying window 103 is allocated.

In the text displaying window 103, the information is displayed with concrete numerals and symbols differently from the graphical display in the layline displaying window 101 and the wind direction displaying window 102.

For example, in the example of FIG. 4, "True NNE" represents the wind direction, and "True 7.2 kt" represents the wind speed. The wind direction and wind speed are determined based on the wind direction azimuth data (e.g., north-northeast, etc.) from the wind direction sensor and the wind speed data.

"RNG 1.20 NM" represents a straight-line distance between the ship and the target position, and is calculated based on the ship position data and the target position data as the latitude and longitude information.

"SRNG1.70 NM" represents a sailing distance in a case where the ship sails to the target position using the maximum windward angle Oup, and is calculated based on the ship position data, the target position data, and the maximum windward angle Oup.

"SOG 6.00 kt" represents a sailing speed of the ship, which may be measured by a ship speed meter not shown in FIG. 1, and may be, for example, calculated by temporal differentiation of displacement of the ship position data.

"TTG 0:12" represents a time (h:m) taken until the ship arrives at the target position, and is calculated based on the calculated ship speed and the sailing distance.

"Sailing Timer 1:03:52" represents an elapsed time of which timing the crew can control to start. Note that the start time of the elapsed time may be set to a time of negative value, and for example, "−0:05:00" may be set to the start time.

The text display like the aforementioned makes it possible to clearly indicate the information including detail numerals and the like which cannot be fully displayed on by the graphical display. This enables the crew to make a more exact determination about the sailing by viewing the information. Note that the above contents displayed in text are only examples, and other information such as the latitude and longitude of the ship may be displayed, for example.

Figure 5:
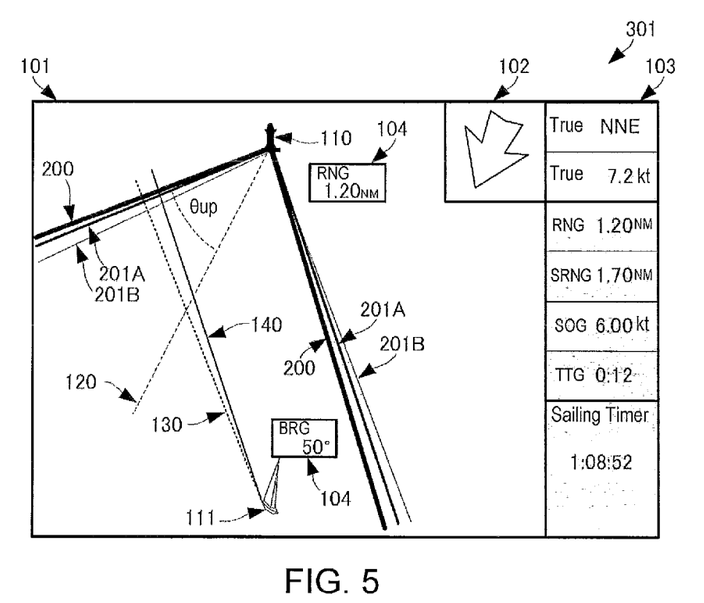
FIG. 5 is a diagram showing a displayed image having a topical window.

Note that the above description shows the example in which the text information is displayed only in the text displaying window 103. However, as shown in FIG. 5, one or more topical windows 104 may be provided in the layline displaying window 101 to display the text information. FIG. 5 is a diagram showing a displayed image 301 having the topical windows 104.

As shown in FIG. 5, the displayed image 301 includes the topical windows 104 besides the layline displaying window 101, the wind direction displaying window 102, and the text displaying window 103 shown in FIG. 4.

The topical window 104 is a topical window showing the text information like the text displaying window 103, and is displayed in an area of the layline displaying window 101. At this time, each topical window 104 is displayed at a position the crew designates or near a mark set in advance having a strong association therewith. For example, in the example shown in FIG. 5, one topical window 104 representing the straight-line distance RNG is displayed near the target mark 110, and another topical window 104 representing an angle BRG formed by the bow azimuth with respect to the target mark 110 is displayed near the ship mark 111. Displaying such a topical window 104 in the layline displaying window 101 enables the crew to easily obtain the information including the detail contents represented by numerical values simply by viewing only the layline displaying window 101.

Third Embodiment

Next, a sail assist device according to a third embodiment of the invention is described with reference to the drawings. Note that the sail assist devices of the above described embodiments display only the ship to be sailed by the crew (hereinafter, referred to as "ship concerned"); however, a sail assist device 10' of this embodiment can also display positions of other ships.

Figure 6:
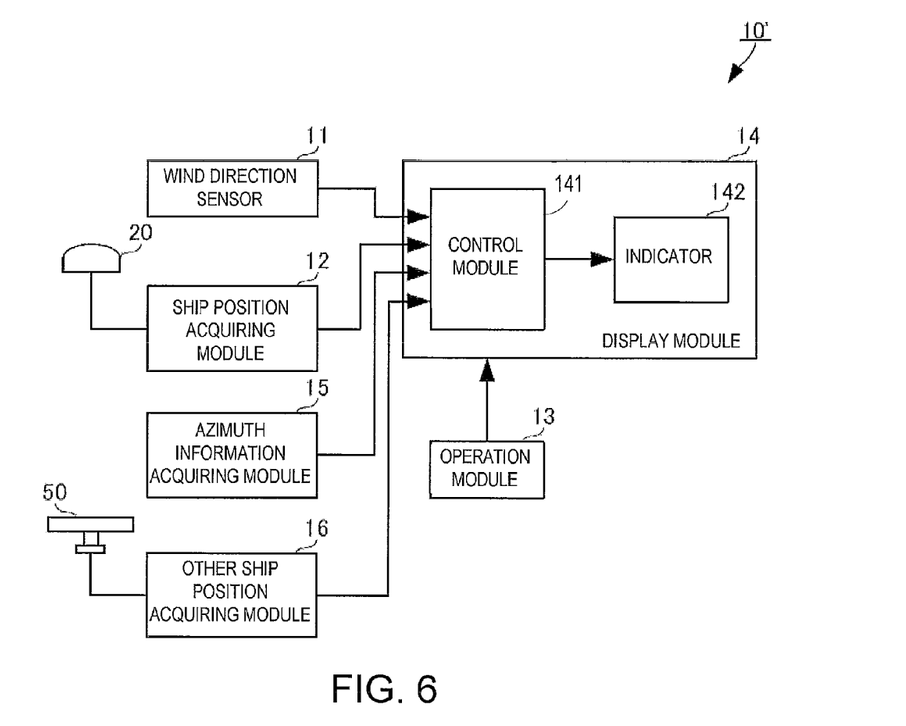
FIG. 6 is a block diagram showing a substantial configuration of a sail assist device according to a third embodiment of the invention.
Figure 7A:
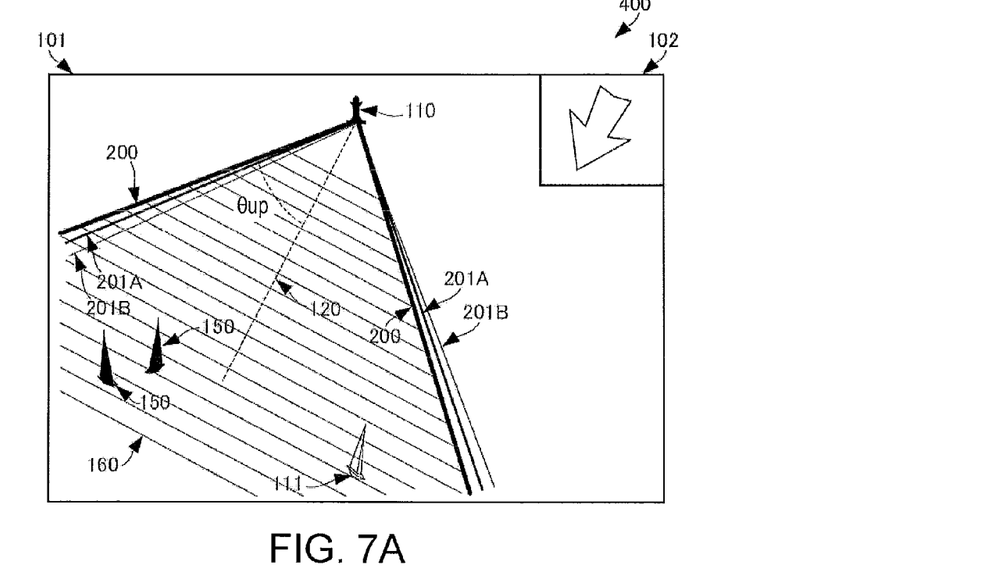
FIGS. 7A and 7B are diagrams showing example displayed images on an indicator shown in FIG. 6.
Figure 7B:
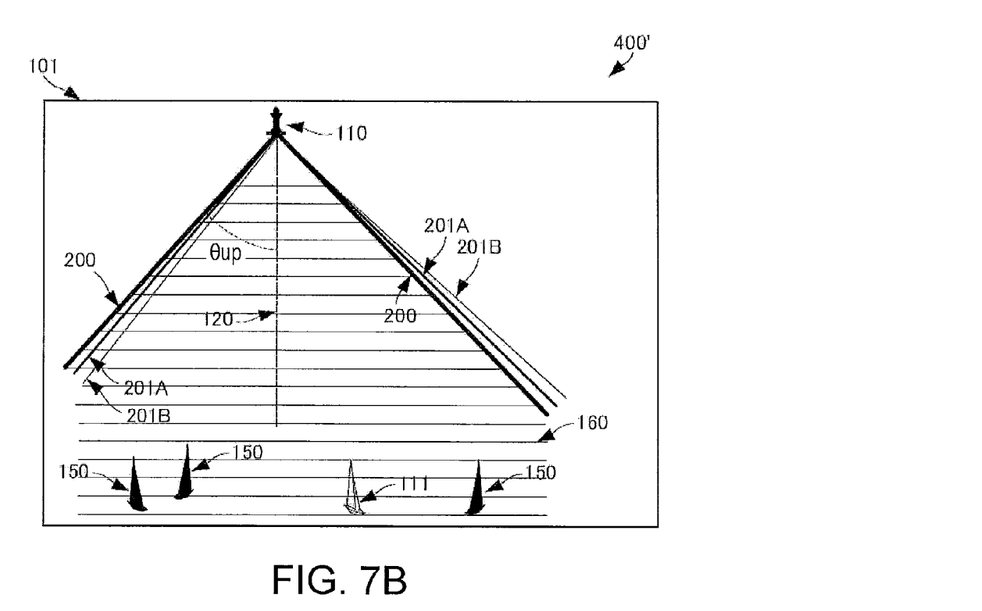

FIG. 6 is a block diagram showing a substantial configuration of the sail assist device 10' of this embodiment. FIGS. 7A and 7B are diagrams showing example displayed images on an indicator 142 according to this embodiment. FIG. 7A shows the case of the target mark-up mode, and FIG. 7B shows the case of the wind-up mode.

In the sail assist device 10' of this embodiment, an other ship position acquiring module 16 is added to the sail assist device 10 of the first and second embodiments. The other ship position acquiring module 16 may be, for example, a radar instrument, and sends a detection signal from a radar antenna 50 and receives a reflected signal thereof. The other ship position acquiring module 16 detects positions of other ships based on the received signal to output other ship position data to the display control module 141 of the display module 14. The display control module 141 calculates the other ship position with respect to the ship concerned position based on the other ship position data and the ship concerned position data. The display control module 141 sets an other ship mark 150 based on the calculated relationship between the ship concerned position and the other ship position with the ship concerned mark 111 being a reference, and displays it on displayed images 400 and 400' as shown in FIGS. 7A and 7B, respectively. In this way, since the ship concerned mark 111 and the other ship marks 150 are displayed together, the crew is easily made to recognize in what positional relationship the ship concerned and the other ships are sailing with respect to the target position.

Furthermore, the display control module 141 sets even lines 160 perpendicular to the wind axis 120 at an equal interval in an extending direction of the wind axis 120 to display on the displayed images 400 and 400' as shown in FIGS. 7A and 7B, respectively. In this way, displaying the even lines 160 enables the crew to easily recognize whether or not the ship concerned is sailing dominantly to the other ships. Note that the case is shown in FIGS. 7A and 7B where the even lines 160 are displayed at an equal interval; however, the even lines 160 may be displayed partly at a narrower interval near the ship concerned, for example.

Note that the above described embodiments show the case where the present layline 200 and the past laylines 201A and 201B are displayed together. However, the positional relationship at each time point between the layline and the ship concerned is known if at least the present layline 200 is displayed, which can be used to determine for the suitable sailing. Further, the number of the past laylines displayed is not necessary to be limited to two, and may be adequately set unlike the above described embodiments.

Additionally, the above described embodiments show the case where the layline is sequentially calculated in response to the input data, but may be calculated in such a manner where the input data is subjected to an averaging process at every sampling interval and thereafter, the layline is calculated based on the averaged value. Moreover, a plurality of laylines sequentially calculated may be subjected to the averaging process at every sampling interval to output the averaged value. With the averaging process like the aforementioned being performed, it can be prevented in which the layline is complicatedly and frequently changed due to the unsteady wind to deteriorate the visibility of the layline. That is, the displayed image the crew can readily view can be displayed.

Furthermore, the above description shows the case where the wind direction window is displayed only in the case of a specific mode, but may be displayed near the target mark, near the ship concerned mark and the like depending on the operation inputted from the operation module.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "approximately" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A sail assist device comprising:
   a wind direction sensor for measuring a wind direction;
   a ship position acquiring module for acquiring a latitude and a longitude of the ship; and
   a display module for
     first calculating a current layline of the ship relative to a target position of the ship during sailing of the ship based on the latitude and longitude of the ship, a latitude and a longitude of the target position of the ship, and the wind direction, with the target position being a reference, and
     first displaying a target mark indicating the target, a ship mark indicating the ship, and the current layline relative to the target mark;
     second calculating an updated layline during sailing of the ship; and
     second displaying the updated layline relative to the target mark during sailing of the ship.

2. The sail assist device of claim 1, wherein the display module calculates the current layline based on the latitude and the longitude of the target position, and the latitude and the longitude of the ship and the wind direction, and displays the calculated current layline as well as one or more past laylines simultaneously.

3. The sail assist device of claim 1, wherein the display module performs an averaging process on a plurality of present and/or past wind directions measured and calculates an averaged layline, or directly calculates an averaged layline based on a plurality of present and/or past laylines, and displays the averaged layline.

4. The sail assist device of claim 1, further comprising an operation module for accepting an input of selection of a wind-up mode in which a windward direction is displayed on a display screen near an upper end therein of an indicator of the display module, and outputting mode information to the display module;
wherein the display module displays the current layline in the wind-up mode.

5. The sail assist device of claim 1, further comprising an azimuth information acquiring module for acquiring a course azimuth of the ship;
wherein the display module calculates a most efficient course azimuth based on the ship position, the target position, the current layline and the course azimuth, and displays the most efficient course and the course azimuth.

6. The sail assist device of claim 1, further comprising an azimuth information acquiring module for acquiring a bow azimuth of the ship;
wherein the display module calculates a most efficient bow azimuth based on the ship position, the target position, the current layline and the bow azimuth, and displays the most efficient bow azimuth and the bow azimuth.

7. The sail assist device of claim 1, further comprising an other ship position acquiring module for acquiring one or more other ships positions;
wherein the display module displays one or more other ship marks that indicates the one or more other ship positions, and displays a plurality of even lines that are perpendicular to a wind axis based on the wind direction and set at a predetermined interval in a direction of the wind axis.

8. The sail assist device of claim 1, wherein the display module further sets a numerical information displaying window that displays various numerical information related to sailing of the ship on a display screen of the display module.

9. The sail assist device of claim 1, wherein the display module displays the target mark, the ship mark, and the current layline in terms of relative position to show a relationship between a present ship position, the layline, and the target mark.

10. The sail assist device of claim 2, wherein the display module displays the calculated current layline and the one or more past laylines in terms of relative position with respect to a present ship position.

11. The sail assist device of claim 2, wherein the latitude and the longitude of the target position, and the latitude and the longitude of the ship and the wind direction are sequentially inputted.

12. A sail assist method comprising:
measuring a wind direction with a wind direction sensor;
acquiring a latitude and a longitude of the ship;
first calculating, with a processor, a present layline relative to a target position of the ship during sailing of the ship based on the latitude and longitude of the ship, a latitude and a longitude of the target position of the ship, and the wind direction, with the target position being a reference;
first displaying, with a display module, a target mark indicating the target, a ship mark indicating the ship, and the present layline relative to the target marc
second calculating an updated layline during sailing of the ship; and
second displaying; the updated layline relative to the target mask during sailing of the ship.

13. The method of claim 12, the step of calculating including calculating an averaged layline, said calculating an averaged layline being realized by at least one of
performing an averaging process on a plurality of present and/or past measured wind directions and calculating an averaged layline based on an outcome of the averaging process, and
directly calculating an averaged layline based on the present layline and at least one previously calculated layline; and
the step of displaying including displaying the averaged layline.

14. The method of claim 12, further comprising:
accepting an input of selection of a wind-up mode in which a windward direction is displayed on a display screen near an upper end therein of an indicator of the display module, and
outputting mode information to the display module; and
wherein displaying includes displaying the present layline in the wind-up mode.

15. The method of claim 12, further comprising:
acquiring a course azimuth of the ship;
wherein calculating includes calculating a most efficient course azimuth based on the ship position, the target position, the present layline and the course azimuth, and
displaying includes displaying the most efficient course and the course azimuth.

16. The method of claim 12, further comprising:
acquiring a bow azimuth of the ship;
wherein calculating includes calculating a most efficient bow azimuth based on the ship position, the target position, the present layline and the bow azimuth, and
displaying includes displaying the most efficient bow azimuth and the bow azimuth.

17. The method of claim 12, further comprising:
acquiring one or more other ships positions;
wherein displaying includes displaying one or more other ship marks that indicates the one or more other ship positions, and displaying a plurality of even lines that are perpendicular to a wind axis based on the wind direction and set at a predetermined interval in a direction of the wind axis.

18. The method of claim 12, displaying further comprising displaying a numerical information displaying window that displays various numerical information related to sailing of the ship on a display screen of the display module.

19. The method of claim 12, displaying including displaying the target mark, the ship mark, and the present layline in terms of relative position to show a relationship between a present ship position, the present layline, and the target mark.

20. A non-transitory computer-readable medium having embodied thereon instructions which, when executed by a processor, cause the processor to perform a sail assist method comprising:
measuring a wind direction with a wind direction sensor;
acquiring a latitude and a longitude of the ship;
first calculating a present layline relative to a target position of the ship during sailing of the ship based on the latitude and longitude of the ship, a latitude and a longitude of the target position of the ship, and the wind direction, with the target position being a reference;
first displaying, with a display module, a target mark indicating the target, a ship mark indicating the ship, and the present layline relative to the target mark:

second calculating an updated layline during sailing of the ship; and
second displaying the updated layline relative to the target mark during sailing of the ship.

* * * * *